(12) United States Patent
Aita

(10) Patent No.: US 7,906,736 B2
(45) Date of Patent: Mar. 15, 2011

(54) SEALED WALL FEEDTHROUGH EQUIPPED WITH A PENETRATION MODULE AND PROCESS OF MODULE REPLACEMENT

(75) Inventor: Franck Aita, Elancourt (FR)

(73) Assignee: Souriau, Versailles (FR)

( * ) Notice: Subject to any disclaimer, the term of this patent is extended or adjusted under 35 U.S.C. 154(b) by 426 days.

(21) Appl. No.: 12/035,092

(22) Filed: Feb. 21, 2008

(65) Prior Publication Data

US 2008/0207034 A1    Aug. 28, 2008

(30) Foreign Application Priority Data

Feb. 22, 2007   (FR) ..................... 07 01265

(51) Int. Cl.
*H02G 3/18* (2006.01)
(52) U.S. Cl. ......... 174/650; 174/662; 174/665; 174/668; 174/669; 439/277; 29/576; 248/56
(58) Field of Classification Search .................. 174/650, 174/662, 665, 668, 669, 135, 659, 11 BH, 174/14 BH; 439/271, 519, 604, 587, 277; 248/56, 49; 29/876

See application file for complete search history.

(56) References Cited

U.S. PATENT DOCUMENTS

| | | | |
|---|---|---|---|
| 4,666,228 A | 5/1987 | Wood | |
| 5,439,392 A | 8/1995 | Rouhier | |
| 7,709,755 B2 * | 5/2010 | Pfister | 174/668 |
| 7,728,235 B2 * | 6/2010 | Mann | 174/650 |

FOREIGN PATENT DOCUMENTS

| | | |
|---|---|---|
| EP | 0940818 A1 | 2/2008 |
| FR | 2697687 A1 | 5/1994 |
| FR | 2698494 A1 | 5/1994 |

* cited by examiner

Primary Examiner — Dhiru R Patel
(74) Attorney, Agent, or Firm — Perman & Green, LLP

(57) ABSTRACT

A sealed wall feedthrough including a cylindrical assembly sleeve fixed and sealed in an opening of the wall, a cylindrical penetration module including joints ensuring the seal arranged on the periphery of its outside face, the module being able to transfer travel into the cylindrical assembly sleeve and includes locking with at least two annular grooves cut into the periphery of the inside face of the assembly sleeve.

10 Claims, 3 Drawing Sheets

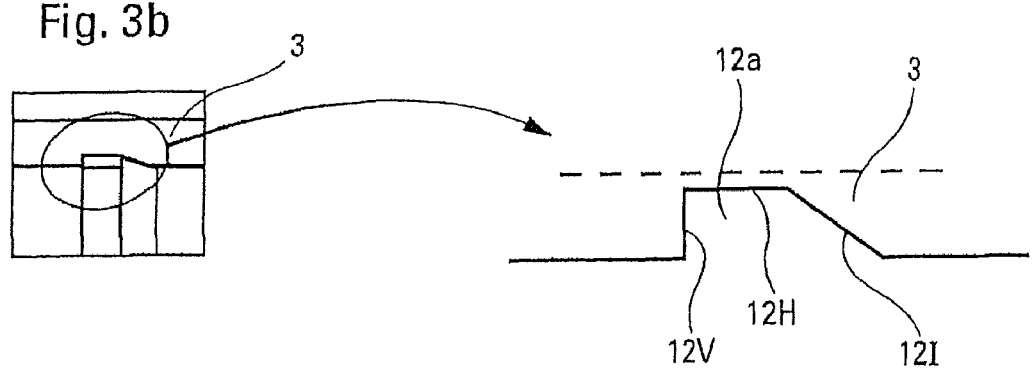
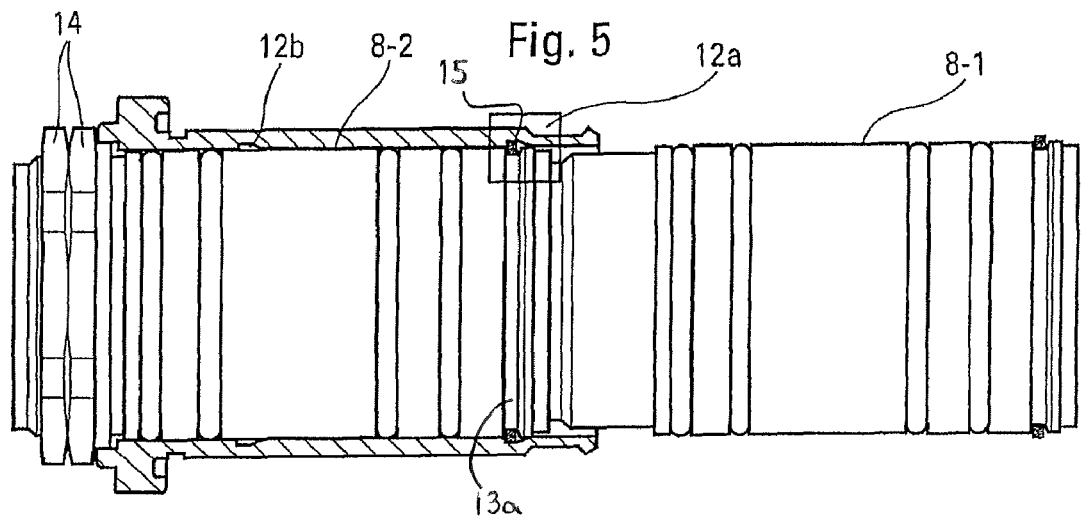
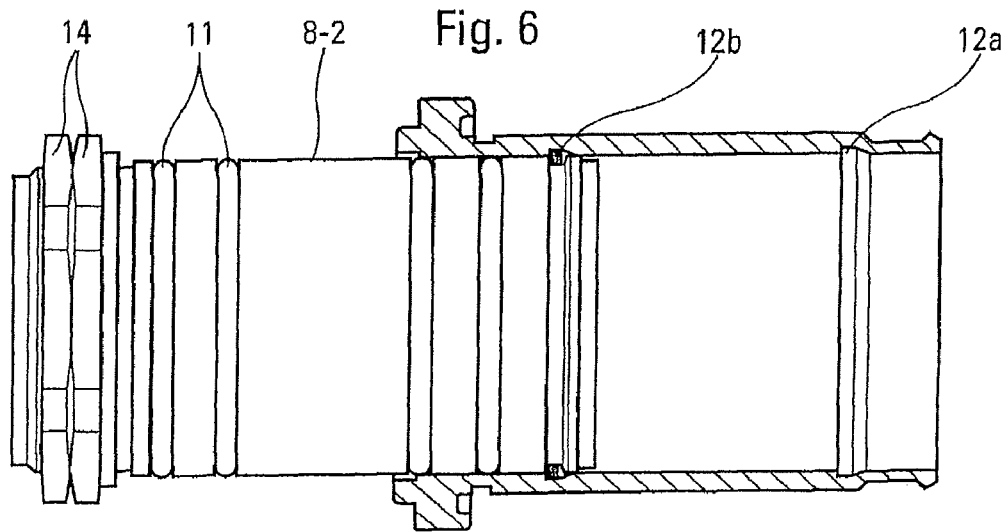

SEALED WALL FEEDTHROUGH EQUIPPED WITH A PENETRATION MODULE AND PROCESS OF MODULE REPLACEMENT

BACKGROUND

1. Field

The disclosed embodiments are directed to a sealed feedthrough equipped with a penetration module destined for a severe environment cell wall feedthrough of the type of those used in the nuclear or chemical industry. The disclosed embodiments likewise provide a penetration module destined for a wall sealed feedthrough. Lastly, it concerns a process of replacement of a penetration module by another module within a sealed wall feedthrough.

2. Brief Description

The disclosed embodiments find a particular application for the distribution of electric currents making possible the functioning of apparatus operating inside these cells.

The use of sealed tubular feedthroughs equipped with adapters making it possible to feed fluids or to make electrical connections inside glove boxes, or so-called "hot" cells, that is to say, inside fenced areas containing dangerous products or sources of radiations, is known in the area of nuclear installations.

Because of severe environmental conditions to which are subjected operating equipment located inside cells as well as adapters located in the wall feedthroughs of these cells, the operatives of these cells must regularly replace the adapters, which equip the said feedthroughs.

An embodiment of a sealed feedthrough is disclosed in the French patent application FR 2 698 494 A1 in which the said feedthrough extends across the wall of a cell from the hot side, namely, the interior of the fenced area which is subject to radiations to the cold side, namely the outside the said cell.

This feedthrough has the form of a sealed part of the wall constituting a cylindrical assembly sleeve into which is inserted an adapter in the form of a connector with sealed joints on the periphery of its housing, which accordingly participate in the seal of the cell. The connector is held in place inside the assembly sleeve by the travel of a locking fork actuated from the outside of the sleeve which acts in concert with a peripheral groove cut into the connector housing. In this way, the connector is fixed, whilst the fork acts in concert with the annular groove and is able to transfer travel, when the fork is extracted from the groove.

According to this embodiment, in the prior art the replacement of a connector by another connector entailed a risk of loss of seal of the wall feedthrough mainly in the gap close beside the annular groove of the housings which receives the connections of the locking fork, a drawback which this embodiment overcomes by positioning a cylindrical sleeve equipped on its periphery with sealed joints between the connector to be replaced and the replacement connector.

Although this method makes it possible to replace adapters without impairing the seal of the cell, it nevertheless necessitates the operations of extraction and insertion of the locking forks, which, in their turn, necessitate the use of precise remote-control manipulators operating likewise on the hot side of the feedthrough. Similarly, the use of an intermediate sleeve arranged between the connectors during the operation of replacement involves an additional "hot" component, which calls for a remotely controlled intervention to extract it from the hot cell and which accordingly increases the number of irradiated components to be stocked.

There is accordingly a need for simplifying the operations of replacement of adapters for wall feedthroughs by means of limiting the number of components to be manipulated by the use of remote-control manipulators, or of robotised devices inside these cells, ensuring complete preservation of the seal of the feedthrough.

This simplification of operations is mainly intended for the positioning and the introduction of new adaptors, which, as appears from patent FR 2 697 687 A1 for example, necessitates a delicate manipulation operation of the said adapters.

U.S. Pat. No. 4,666,228 describes a glove box wall feedthrough equipped with a connector comprising on its outer surface two grooves, which serve as receptacles with two sealed silicone joints acting in concert with the internal surface of the feedthrough sleeve. These two joints are positioned in the longitudinal direction of the connector body in such a way that the seal of the feedthrough is provided by at least one of the joints during the replacement by the thrust of the connector to be eliminated. The teaching of this patent is supplemented by a publication of Pave Technology Inc in which, apart from the principle of tightness, an elastic anti-withdrawal ring is mentioned and shown in accompanying figures. This publication teaches that the use of an elastic split ring to prevent the untimely withdrawal of a connector via the cold side of the glove box, is known.

Nevertheless, this ring only performs a connector anti-withdrawal function, when the connector is finally positioned in the sleeve.

Likewise, in order to ensure the full preservation of the seal of the feedthrough, there is a major need to eliminate any risk of untimely withdrawal of an adapter in service and more particularly on its introduction during the replacement operation.

SUMMARY

The disclosed embodiments are directed to a device enabling the full preservation of the seal of a wall tubular feedthrough during the operation of replacement by another penetration module of an adapter in the form of a penetration module.

With that objective in view, the disclosed embodiments concern a wall sealed feedthrough comprising a cylindrical assembly sleeve sealed in an opening of the wall, a cylindrical penetration module comprising means of ensuring a seal arranged on the periphery of its outside surface, the said module being able to transfer travel into the cylindrical assembly sleeve, means allowing the locking of the module inside the assembly sleeve, comprising a first means of locking consisting of at least two annular grooves cut into the periphery of the inside face of the assembly sleeve.

According to one of the principal characteristics of the disclosed embodiments, the grooves cut in the periphery of the inside face of the assembly sleeve have a profile defined by a vertical plane, a horizontal plane and an inclined plane.

According to one of the principal characteristics of the disclosed embodiments, the module comprises a housing with means of providing a seal on the periphery of its outside face, a second means of locking consisting of a groove is arranged into which is inserted a split ring possessing a high coefficient of elasticity. According to this characteristic, the ring is made of stainless steel and has a rectangular section.

According to one of the principal characteristics of the disclosed embodiments, the vertical plane of one of the grooves of the first means of locking of the assembly sleeve acts in concert with the second means of locking of the module, which is complementary to it.

According to the disclosed embodiments, the module comprises a third means of locking, which in conjunction with the second means provides the preservation of the penetration module in the sealed position.

The disclosed embodiments likewise have the objective of providing a process, which makes it possible to ensure the complete preservation of the seal of a wall feedthrough during the operation of replacement by another penetration module of an adapter in the form of a penetration module.

According to one of the principal characteristics of the disclosed embodiments, the vertical plane and the inclined plane of the grooves cut into the periphery of the internal face of the assembly sleeve, only permit the transfer travel of penetration modules into the assembly sleeve in one direction extending from the cold side to the hot side of the cell.

According to one of the principal characteristics of the disclosed embodiments, the vertical plane of the groove cut into the periphery of internal face of the assembly sleeve on the cold side of the cell prevents any withdrawal of the penetration module via the cold side of the cell.

BRIEF DESCRIPTION OF THE DRAWINGS

The disclosed embodiments will be better understood with the help of the description, which follows and of the appended figures where.

FIG. 3b is a sectional view of a first means of locking of the said penetration module;

FIG. 5 is a locked penetration module;

FIG. 6 is a means of anti-withdrawal of a penetration module.

DETAILED DESCRIPTION

Figure 1:
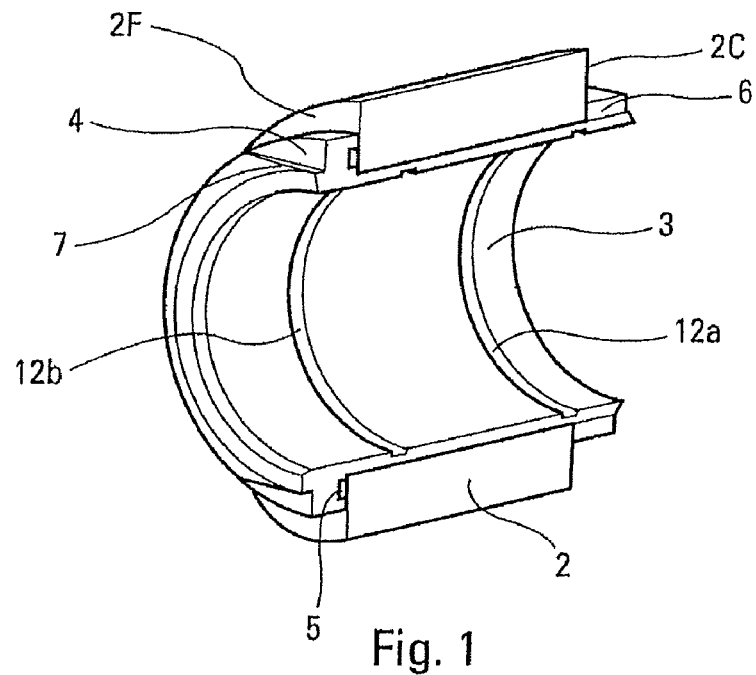
FIG. 1 is a perspective view of an assembly sleeve for a wall feedthrough according to the disclosed embodiments.

FIG. 1 shows in perspective an assembly sleeve 3 for a so-called "hot" cell wall feedthrough, or a glove box. In the said FIG. 1, as well as in FIG. 3 which is a sectional view of the assembly sleeve, the said assembly sleeve is positioned and fixed in an opening of the wall, partially shown in 2, the wall which separates the hot side 2C of the cell, namely, the inside of the fenced area subject to radiations and the cold side 2F, namely the outside of the cell. The sleeve 3 has the form of a cylinder, preferably made of corrosion-resistant stainless steel and comprising at one of its ends a flange 4 supporting face 2F of the wall. This flange comprises on its lateral face parallel to and contiguous with the wall, a positioning annular groove of the O-ring type joint 5 providing the seal between flange 4 and wall 2. On the opposite lateral face, the flange comprises a shoulder 7 making possible the approach of a polarising device needed for the angular positioning of the penetration module during its introduction into the assembly sleeve 3.

The other end of the sleeve 3 is provided on its outside surface with a thread, making it possible to be fixed in the opening of the wall 2 using a nut 6. The said thread makes it possible to fix the assembly sleeve on walls of a different thickness and at least makes it possible to secure a perfect seal by freeing itself from differences of geometry and from tolerance variations.

The assembly sleeve 3 comprises two annular grooves 12a and 12b cut into the periphery of its inside face which constitute a means of locking called the first means of locking 12, whose role will be described below. The said annular grooves 12a and 12b cut into the periphery of the inside face of the assembly sleeve have a profile defined by a vertical plane 12V, a horizontal plane 12H and an inclined plane 12I with respect to the horizontal axis of the sleeve 3 as shown in FIG. 3b.

Figure 2:
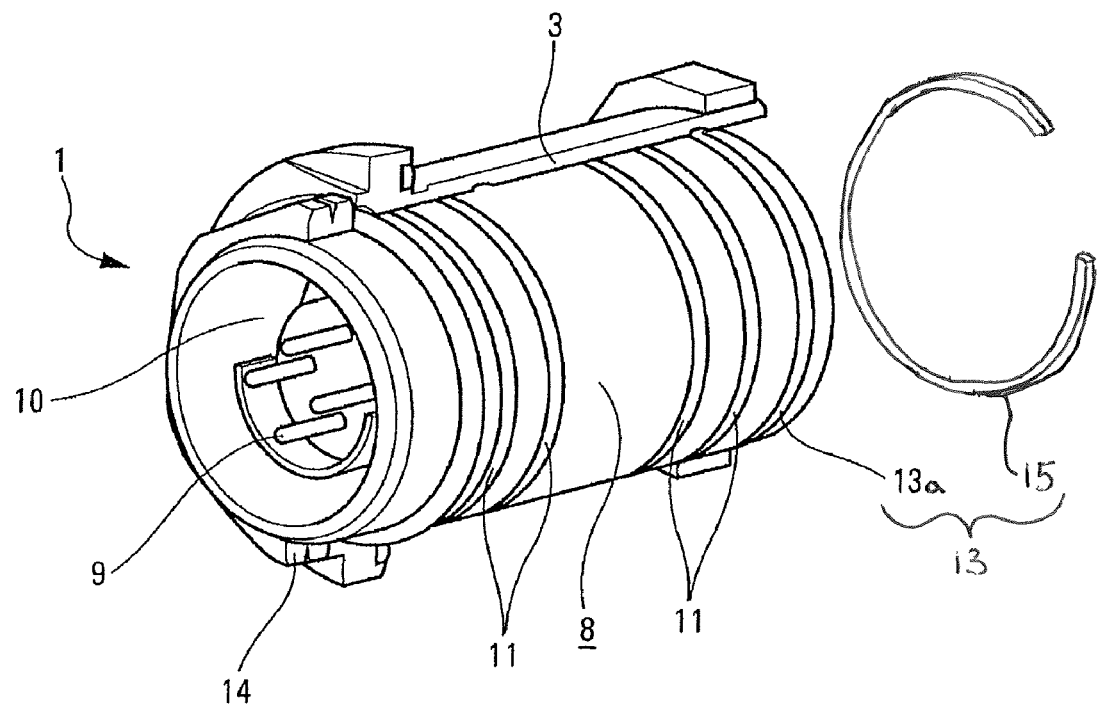
FIG. 2 is a perspective view of an assembly sleeve for a wall feedthrough equipped with a penetration module according to the disclosed embodiments.
Figure 3:
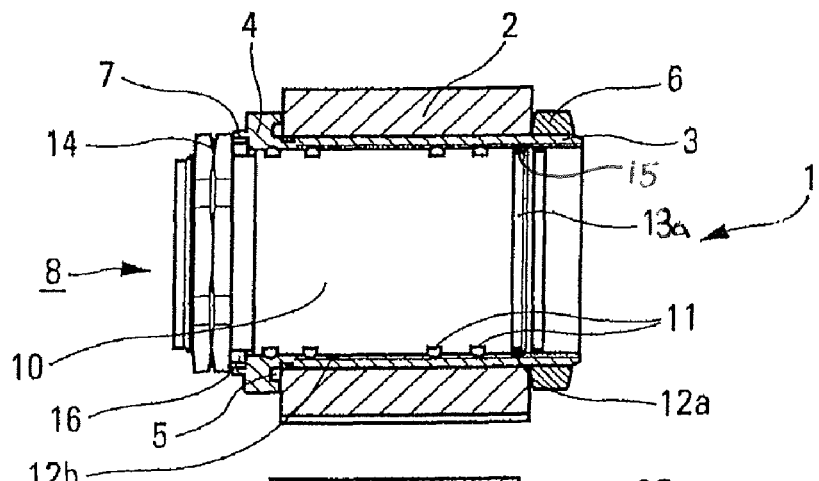
FIG. 3 is a sectional view of an assembly sleeve for a wall feedthrough equipped with a penetration module according to the disclosed embodiments.

FIG. 2 is a perspective view of a sealed wall feedthrough 1 comprising an assembly sleeve 3 equipped with an adapter or a penetration module 8. This assembly is also shown in FIG. 3, except for the electrical contacts 9 which transmit control and power signals for feeding the equipment operating in the hot cell. Only the "cold" side contacts are shown in FIG. 2, but it is clear that similar contacts (male or female) are located on the "hot" side. These contacts are encapsulated in a resin, which fills the entire inside space of the penetration module 8, ensuring the containment of the cell. It should be noted that in this non-limitative embodiment the module 8 is equipped with electrical contacts, but it is clear that this penetration module can be equipped with ducts to make possible the feeding of the equipment with fluids. Similarly, the module can be mixed and receive electrical contacts and fluid ducts.

As shown in FIG. 3, the penetration module 8 consists of a cylindrical metal housing 10 provided with means of ensuring seals 11 arranged on the periphery of its outside face. These means of ensuring a seal consist of joints of the O-ring type positioned in the grooves cut into the outside face of the housing 10. As it will be explained below, the seals 11 provides the seal between the "cold" side and the "hot" side during the transfer travel of the module 8 into the cylindrical assembly sleeve 3.

The module likewise comprises on the periphery of its outside face means 13 and 14 making possible its locking inside of the assembly sleeve.

A second means of locking 13 consists of a groove 13a into which is inserted a high coefficient of elasticity split ring 15 and whose complementary role with the first means 12 will be explained below. The ring 15 is preferably made from stainless steel and has a rectangular section. It is clear that this section may have a different geometrical form.

A third means of locking 14 in the form of a nut and a locknut screwed onto the outside thread cut into the end part on the cold side of the housing 10. In conjunction with the first means 12 and the second means 13, these nuts of the third means of locking 14 ensure the preservation of module 8 in the position of a sealed feedthrough 1 during the functioning of equipments located in the cell. It should be noted that the nuts of the third means of locking 14 bear on the shoulder 7 of the flange 4 and hold in place the polarising device 16 needed for the angular positioning of the penetration module during its positioning in the assembly sleeve 3. The polarising device 16 has the form of an indexed ring whose disassembly is necessary before any transfer travel of the penetration module 8.

The housing 10 moreover comprises at each of its ends means enabling connectors located outside the cell and those located inside the cell, to be connected and thus provide electrical continuity between the apparatus and the sources of power, or of signal. These means consist either of threads cut into the inside face of the housing, or of latches of the push-pull type.

Figure 4A:
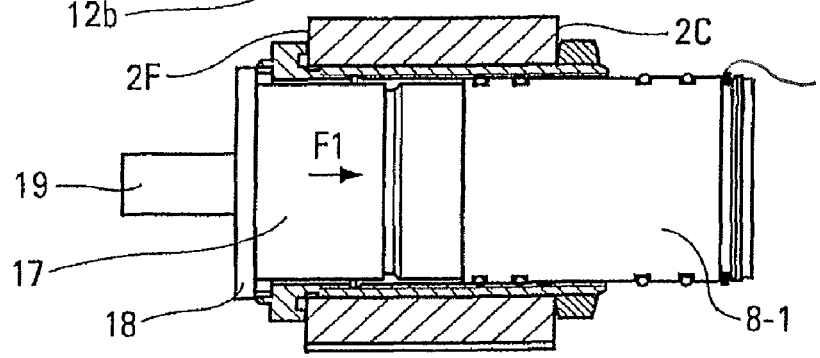
FIGS. 4a to 4c are respectively phases of the method of replacement of a penetration module by another module.
Figure 4B:
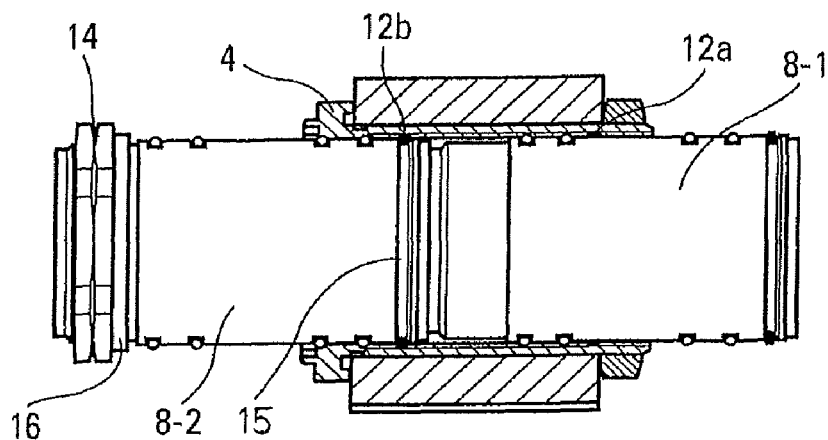
Figure 4C:
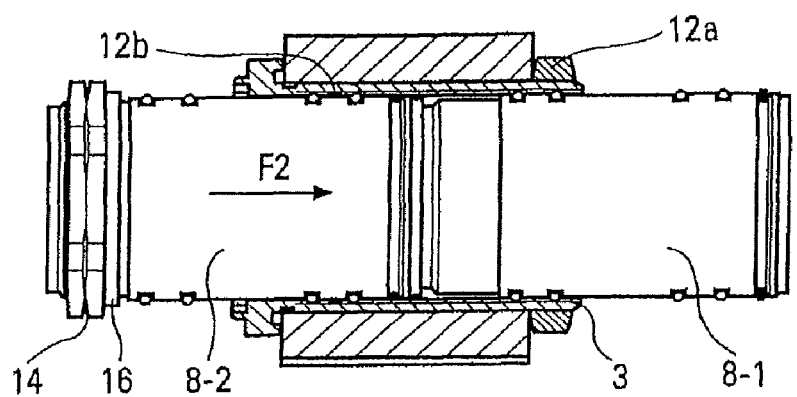

FIGS. 4a to 4c show the principal phases of the process of replacement of a penetration module 8-1 to be replaced by a new module 8-2 inside a sealed wall feedthrough 1 without loss of seal of the said wall feedthrough.

As shown in FIG. 4a, the process developed by the disclosed embodiments consists in unscrewing the nuts 14 of module 8-1 and in removing the ring of the polarising device 16 so as to free the penetration module 8-1, so that it can be transferred by being dragged in one direction shown by arrow F1 extending from the cold side 2F to the hot side 2C of the cell.

After disassembly, a tool 17 is docked on the back of the module 8-1 and pushes it, as shown by arrow F1, as far as a specific location defined by the bearing of flange 18 of tool 17 on the shoulder 7 of flange 4 of the assembly sleeve. This push frees the second means of locking 13 from the first means of locking 12, preserving the seal made by the seals 11 located at the back of module 8-1. The exerted push thus enables the high coefficient of elasticity split ring 15 to be held by friction on the inclined plane 12I and to retract into the groove containing it.

It should be noted that the pre-positioning tool 17 can be manipulated by a robotised device fitted on shank 19.

FIG. 4b shows the positioning of the replacement module 8-2. Prior to its introduction into the assembly chamber 3, the back end of the new module 8-2 is equipped with nut and counter-nut 14 as well as the indexed ring of the polarising device 16. The other end is introduced into the central space of the sleeve 3 and the module is pushed until the second means of locking 13 of the module 8-2 locks into the first means 12b of sleeve 3. The new module 8-2 is now held in place since the split ring 15 of the means of locking 13 is held in the annular groove 12b of the sleeve 3, the seal now being provided by the back seal 11 of the module 8-1 and by the front seal 11 of the module 8-2.

FIG. 4c shows the pushing action exerted simultaneously by the module 8-2 on the module 8-1 until the latter reaches the position preceding the fall into the hot cell, where it will be taken over by a remote-control manipulator, which will place it in protective container prior to its evacuation from the cell.

The push exerted in the direction shown by arrow F2 accordingly enables the high coefficient of elasticity split ring 15 of the second locking device 13 of module 8-2 to free itself from the first means of locking 12b by being held by friction on the inclined place 12I of the groove of the assembly sleeve 3 and by being retracted into the groove of module 8-2 which contains it, until it reaches the first means of locking 12a. The retention of the ring 15 equipping the module 8-2 in the groove of the first locking device 12a makes it possible to lock module 8-2 in position by the complementary action of the split ring 15 and of the vertical plane 12V of the annular groove 12a.

FIG. 5 shows the positioning and the final locking of module 8-2 prior to the fall of the old module 8-1. This stage is reached by the implementation of the third means of locking 14 which, in conjunction with the second means 13 in conjunction with means 12, ensures the preservation of the penetration module in the maximum sealing position. As stated earlier, the third means of locking 14 is shown in the figures as a nut equipped with a counter-nut. Nevertheless, a variant of the third means is shown in the form of a coupling ring, which provides the locking of the module by clamping on the end part on the cold side of housing 10.

FIG. 6 shows a partial insertion of a replacement module 8-2 where a manipulation error could affect the replacement operation. In fact, in order to ensure the complete preservation of the seal of the feedthrough, there is an imperative need to eliminate any risk of untimely withdrawal of a module 8-2 during its introduction, during or after the operation of replacement.

As it can be seen from FIG. 6, the second means of locking of module 8-2 has not reached the first means of locking 12a of sleeve 3. A withdrawal movement of module 8-2 is now effected as far as the second means of locking 12b, where the withdrawal of module 8-2 is stopped by the action of expansion of the split ring 15 into the groove 12b. More precisely, this action of complementary locking is effected by the concerted action of the ring and of the vertical plane 12V of groove 12b.

FIGS. 5 and 6 thus show the advantages provided by the characteristics of the disclosed embodiments, according to which the identically designed annular grooves 12a and 12b make possible two different functions in conjunction with the split ring 15. The first function, namely, the locking in place of the module takes place via 12a whilst 12b makes possible the second function, namely, the anti-withdrawal of the module during its introduction and prior to its final locking.

The stages described above show that the vertical plane 12V and the inclined plane 12I of grooves cut into the periphery of the inside face of assembly sleeve 3 only make possible the transfer travel of penetration modules 10 into the assembly sleeve in one direction parallel to the horizontal axis of the sealed feedthrough 1 extending from the cold side to the hot side of the cell. Similarly, the vertical plane 12V of the groove cut into the periphery of the inside face of the assembly sleeve 3 on the cold side of the cell prevents any withdrawal of the penetration module 10 via the cold side of the cell.

The disclosed embodiments are not limited to the characteristics of the described devices but on the contrary comprises all variants.

The invention claimed is:

1. A sealed wall feedthrough comprising a cylindrical assembly sleeve having an inside face fixed and sealed in an opening of a wall, a cylindrical penetration module comprising a cylindrical housing having an outside face and an outside thread cut into an end part thereof and a seal ensuring the seal arranged around a periphery of the outside face of the housing, the module being able to transfer travel into the cylindrical assembly sleeve, the sealed wall feedthrough further comprising:

a first means of locking consisting of at least two annular grooves cut into a periphery of an inside face of the cylindrical assembly sleeve, a second means of locking arranged around the periphery of the outside face of the housing of the penetration module, consisting of a groove into which is inserted a high coefficient of elasticity split ring acting by expansion in support of one of the at least two annular grooves of the first means, a third means of locking consisting of a nut screwed onto the outside thread cut into an end part of the housing that cooperates with the first and second means to provide a retention of the penetration module inside the assembly sleeve.

2. A sealed wall feedthrough according to claim 1, in which the annular grooves of the first means of locking have a profile defined by a vertical plane, a horizontal plane and an inclined plane.

3. A sealed wall feedthrough according to claim 2, in which the vertical plane of one of the grooves of the first means of locking of the cylindrical assembly sleeve works in conjunction with the ring of the second means of locking in order to hold the penetration module in position inside the cylindrical assembly sleeve.

4. A sealed wall feedthrough according to claim 1, in which the split ring is made from stainless steel.

5. A sealed wall feedthrough according to claim 1, in which the split ring has rectangular section.

6. A process making possible a complete preservation of a seal of a wall feedthrough separating hot and cold sides of a hot cell, the feedthrough being sealed and comprising a cylindrical fixed assembly sleeve sealed into an opening of the wall during operation of replacement of an adapter in a form of a cylindrical penetration module to be replaced by a replacement cylindrical penetration module, the modules comprising means of sealing them arranged around a periphery of their outside face, the assembly sleeve receiving a polarising device in a form of an indexed ring, making possible an angular positioning of the modules, the assembly sleeve and the cylindrical penetration module and replacement cylindrical penetration module both comprising a first, second and third means of locking, making it possible to hold a respective one of the cylindrical penetration module and replacement cylindrical penetration module inside the assembly sleeve, the process comprising:

a stage of disassembly of the third means of locking and of the polarising device of the cylindrical penetration module to be replaced in order to make possible its transfer into the assembly sleeve;

a stage of pushing of the cylindrical penetration module to be replaced using a tool in a direction a first direction (F1) making possible a freeing of the second means of locking due to an inclined plane of annular grooves of the first means of locking;

an introduction on the replacement cylindrical penetration module of the third means of locking and of the polarising device, its positioning in the assembly sleeve and a simultaneous travel of both the cylindrical penetration module and the replacement cylindrical penetration module in a second direction (F2);

the locking in position of the replacement cylindrical penetration module by a supplementary action of a split ring of the second means of locking and of a vertical plane of a the annular grooves of the first means of locking; and a final locking of the replacement cylindrical penetration module by the third means of locking, the third means of locking cooperating with the first and second means to provide a retention of the replacement cylindrical penetration module inside the assembly sleeve.

7. A process making it possible to ensure the complete preservation of the seal of a sealed wall feedthrough according to claim 6 in which the vertical plane and the inclined plane of the annular grooves of the first means of locking cut into a periphery of an inside face of the assembly sleeve only allow the transfer travel of the cylindrical penetration modules into the assembly sleeve in one direction extending from the cold side to the hot side of the hot cell.

8. A process making it possible to ensure the complete preservation of the seal of a sealed wall feedthrough according to claim 6, in which the vertical plane of the annular grooves of the first means of locking cut into a periphery of an inside face of the assembly sleeve on the cold side of the hot cell prevents any withdrawal of the replacement cylindrical penetration module via the cold side of the hot cell.

9. A process making it possible to ensure the complete preservation of the seal of a sealed wall feedthrough according to claim 6, in which a final locking of the replacement cylindrical penetration module by the third means of locking takes place by screwing.

10. A process making it possible to ensure the complete preservation of the seal of a sealed wall feedthrough according to claim 6, in which a final locking of the replacement cylindrical penetration module by the third means of locking takes place by clamping.

* * * * *

UNITED STATES PATENT AND TRADEMARK OFFICE
CERTIFICATE OF CORRECTION

PATENT NO. : 7,906,736 B2  Page 1 of 1
APPLICATION NO. : 12/035092
DATED : March 15, 2011
INVENTOR(S) : Franck Aita It is certified that error appears in the above-identified patent and that said Letters Patent is hereby corrected as shown below:

Column 8, Claim 6, Line 4, before the word "the" delete "a".

Signed and Sealed this
Twenty-sixth Day of April, 2011

David J. Kappos
*Director of the United States Patent and Trademark Office*